(No Model.)

J. D. WARD.
THERMOMETER.

No. 409,379. Patented Aug. 20, 1889.

Attest.
R. F. Osgood
P. H. Kostick

Inventor.
John D. Ward

UNITED STATES PATENT OFFICE.

JOHN D. WARD, OF ROCHESTER, NEW YORK.

THERMOMETER.

SPECIFICATION forming part of Letters Patent No. 409,379, dated August 20, 1889.

Application filed June 24, 1886. Serial No. 206,147. (No model.)

*To all whom it may concern:*

Be it known that I, JOHN D. WARD, of the city of Rochester, in the county of Monroe and State of New York, have invented a certain new and useful Improvement in Thermometers; and I do hereby declare that the following is a full, clear, and exact description of the same, reference being had to the drawings accompanying this application.

My improvement relates to what are known as "distance-thermometers," the object being to enable the temperature to be read at a greater distance than in common thermometers.

To this end the invention consists of a scale-plate for thermometers divided off into blocks or sections of two or more different colors, each block or section including a certain number of degrees, all as hereinafter described. By this means the eye can readily distinguish at a distance the different blocks or sections, and by noting the rise of the column in any block the temperature will be approximately known by means of large figures used in connection with the blocks.

Figure 1:
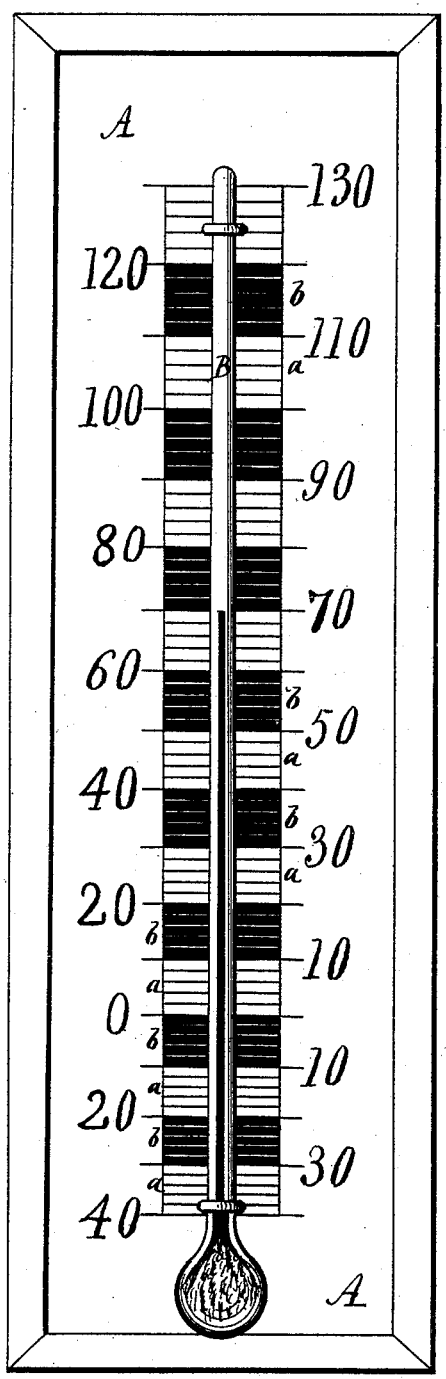
Figure 2:
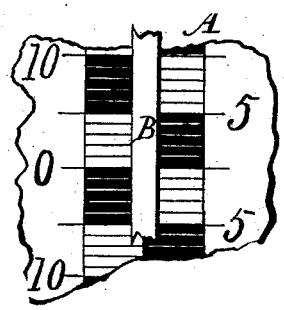

In the drawings, Figure 1 is an elevation of a thermometer showing my invention. Fig. 2 is a similar view of a portion of same, showing a modification.

A indicates the scale-plate, and B the tube. The scale-plate is laid off into degrees, as usual, and in case a spirit-tube is used, as is preferable in this kind of thermometer, the spaces between the degrees gradually increase in width from bottom to top to compensate for the tendency of the column to rise more rapidly at top than bottom. This, however, can be adapted to circumstances, and, if desired, a mercurial instead of a spirit tube can be used. The scale is laid off into a series of blocks or sections $a$ $b$ of two or more different colors or shades—for instance, black and white—each block or section including a certain number of degrees—say five or ten, as may be desired. The drawing Fig. 1 shows each section as comprising ten degrees, each line indicating two degrees. It is evident it might include only five degrees, or any number more or less, and each line indicate a single degree; but in that case it would have to be of wide or open range. Each light-colored section $a$ has dark degree-lines, while each dark-colored section $b$ has light-colored or white degree-lines, the object being to produce a contrast in the lines as well as the colors of the different blocks.

At one or both sides of the scale are mounted large figures, corresponding with those ordinarily used on thermometers, to indicate degrees, extending from zero upward to any desired extent, and from zero downward, if desired. I prefer to mark on opposite sides, as shown, the figures being alternated, as by that means much larger figures can be used; but they can be marked all on one side and make an effective distance-thermometer if of open range. Each number indicates a block or section such as above described. Thus in the drawings, commencing with 0, the number 10 at the right indicates the first block, the number 20 at the left indicates the second block, the number 30 at the right indicates the third block, and so on to the end. In case the scale were made up of blocks of five instead of ten, the first block would be indicated by 5, the second by 10, the third by 15, and so on, as in Fig. 2. The great advantage of this arrangement is that by dividing the scale into blocks or sections of different colors, each representing a certain number of degrees, and using in connection therewith a tube and large figures at the sides, the temperature can be determined approximately at a distance by reason of the contrasting colors of the sections. For instance, if the column rises to the middle of a white section, there will be a black section above and below, which will serve to distinguish the white section to the eye, and there will also be large figures at the sides to indicate it. Therefore it will be known that the temperature is midway between the two numbers above and below the white section. The same is true if the column stands higher or lower in the white section. The temperature can be ascertained approximately. If the column rises to a black section, a white section stands above and below, and the same result is produced. This result cannot be produced where the whole scale is of one color, as there is nothing then to distinguish the location of the column, and the temperature can only be read from the figures. Neither can this result be produced by the use of different-colored degree-lines on the scale, as they cannot be seen at a distance.

This invention can be used in connection not only with vertical thermometers, but also horizontal, or registering, circular, and segmental ones, and also with scales having the degree-marks wider apart at one end than the other, as in my patent of February 16, 1886, No. 336,181. The blocks or sections can also, if desired, be arranged alternately on opposite sides, as shown in Fig. 2.

Having described my invention, what I claim as new, and desire to secure by Letters Patent, is—

A thermometer-scale plate having the degree-marks laid off in blocks or sections of contrasting colors, each block or section including a certain number of degrees, the degree-marks on the light-colored sections being black and those on the dark-colored sections being white, as set forth.

In witness whereof I have hereunto signed my name in the presence of two subscribing witnesses.

JOHN D. WARD.

Witnesses:
P. A. COSTICH,
R. F. OSGOOD.